(12) United States Patent
Sekiyama

(10) Patent No.: US 11,683,756 B2
(45) Date of Patent: Jun. 20, 2023

(54) COMMUNICATION DEVICE AND METHOD FOR CONTROLLING SAME

(71) Applicant: Icom Incorporated, Osaka (JP)

(72) Inventor: Yoshio Sekiyama, Osaka (JP)

(73) Assignee: Icom Incorporated, Osaka (JP)

( * ) Notice: Subject to any disclaimer, the term of this patent is extended or adjusted under 35 U.S.C. 154(b) by 0 days.

(21) Appl. No.: 17/514,240

(22) Filed: Oct. 29, 2021

(65) Prior Publication Data

US 2022/0159572 A1  May 19, 2022

(30) Foreign Application Priority Data

Nov. 17, 2020  (JP) .............................. JP2020-191116

(51) Int. Cl.
*H04W 52/02* (2009.01)

(52) U.S. Cl.
CPC .............................. *H04W 52/0225* (2013.01)

(58) Field of Classification Search
CPC ........... H04W 52/0225; H04W 52/367; H04W 52/283; Y02D 30/70
See application file for complete search history.

(56) References Cited

U.S. PATENT DOCUMENTS

2012/0007750 A1* 1/2012 Gorabi .................... B63B 43/00
340/984
2020/0304220 A1* 9/2020 Chen ........................ G08G 3/00

FOREIGN PATENT DOCUMENTS

JP  4848264 B2  12/2011

* cited by examiner

*Primary Examiner* — Jamal Javaid
(74) *Attorney, Agent, or Firm* — McCarter & English, LLP; David G. Conlin

(57) ABSTRACT

A communication device that reduces power consumption is realized by appropriately setting a transmission output power value for DSC communication. A communication device (1) includes: an AIS receiving section (11) for receiving information related to an AIS; a DSC communication section (12) for performing DSC communication; and a transmission output power setting section (15c) configured to set a transmission output power value for communication performed on a conversation channel by the DSC communication section to a value corresponding to a distance, which is calculated based on the information, between the communication device and a communication target vessel.

7 Claims, 3 Drawing Sheets

COMMUNICATION DEVICE AND METHOD FOR CONTROLLING SAME

CROSS REFERENCE TO RELATED APPLICATION

This Nonprovisional application claims priority under 35 U.S.C. § 119 to Patent Application No. 2020-191116 filed in Japan on Nov. 17, 2020, the entire contents of which are hereby incorporated by reference.

TECHNICAL FIELD

The present invention relates to a communication device, particularly to a communication device for vessel communication, and a method for controlling the communication device.

BACKGROUND ART

Patent Literature 1 discloses a vessel radio device having the function of easily determining whether or not a target vessel is present within a communication range. The device has a presence-within-range determining section into which an other vessel information signal is inputted. The other vessel information signal includes other vessel information in which vessel operation information and unique information about each of the other vessels are arranged as information elements. By determining, based on the other vessel information, whether a distance to a vessel with a preset identification number is less than or equal to a distance within a preset communication range, the presence-within-range determining section determines whether the position of the vessel is within the communication range.

CITATION LIST

Patent Literature

[Patent Literature 1]
Japanese Patent No. 4848264

SUMMARY OF INVENTION

Technical Problem

However, in the vessel radio device disclosed in Patent Literature 1, there is no disclosure about the setting of a transmission output power value for digital selective calling (DSC) communication in a case where communication is performed with a vessel which is present within the communication range.

It is an object of an aspect of the present invention to realize a communication device and the like that reduce power consumption by appropriately setting the transmission output power value for DSC communication.

Solution to Problem

In order to solve the above problem, a communication device in accordance with an aspect of the present invention includes: an AIS receiving section for receiving information related to an automatic identification system (AIS); a DSC communication section for performing digital selective calling (DSC) communication; and a transmission output power setting section configured to set a transmission output power value for communication performed on a conversation channel by the DSC communication section to a value corresponding to a distance, which is calculated based on the information, between said communication device and a communication target vessel.

Further, a method for controlling a communication device in accordance with an aspect of the present invention, includes: the communication device receiving information related to an AIS; the communication device performing DSC communication; and the communication device setting a transmission output power value for DSC communication performed on a conversation channel to a value corresponding to a distance, which is calculated based on the information, between the communication device and a communication target vessel.

Advantageous Effects of Invention

According to the communication device and the like in accordance with an aspect of the present invention, it is possible to reduce power consumption by appropriately setting the transmission output power value for DSC communication.

DESCRIPTION OF EMBODIMENTS

Embodiment 1

The following description will discuss an embodiment of the present invention in detail.

(Configuration of Communication Device 1)

Figure 1:
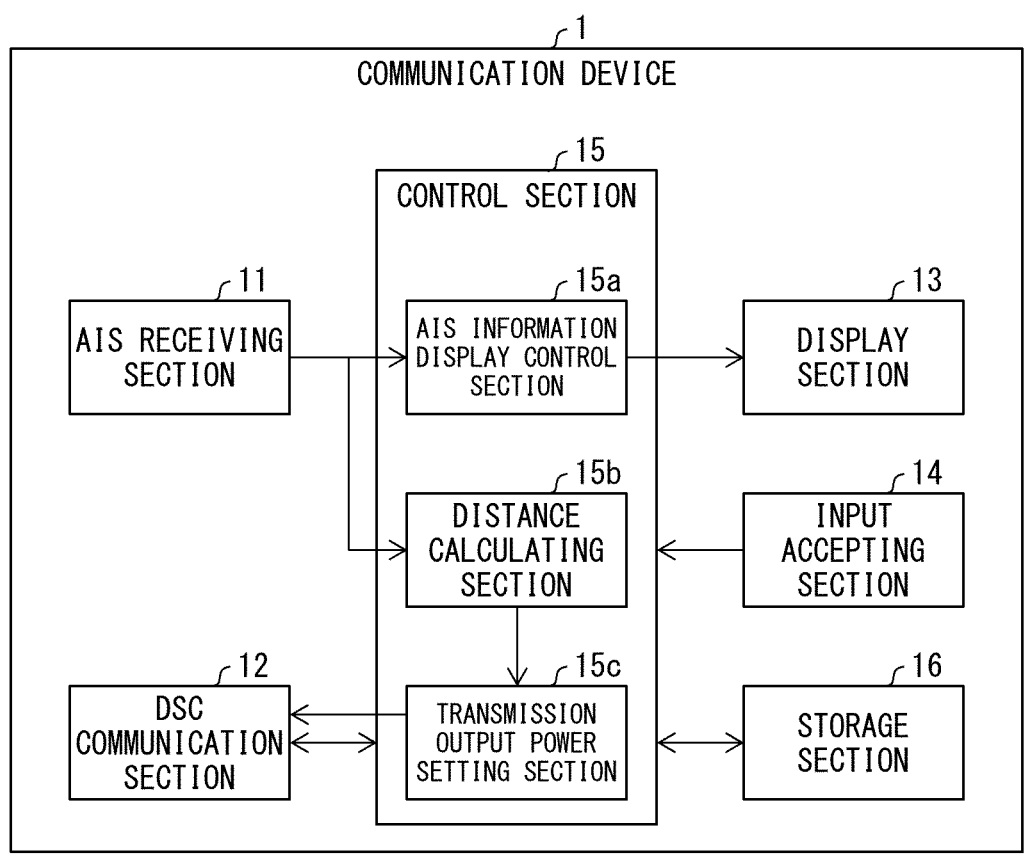
FIG. 1 is a block diagram illustrating a configuration of a main part of a communication device in accordance with an embodiment of the present invention.

FIG. 1 is a block diagram illustrating a configuration of a main part of a communication device 1 in accordance with an embodiment of the present invention. The communication device 1 is assumed to be, but is not limited to, a handheld communication device for vessel communication. As illustrated in FIG. 1, the communication device 1 includes an AIS receiving section 11, a DSC communication section 12, a display section 13, an input accepting section 14, a control section 15, and a storage section 16. The communication device 1 further include constituent components (not illustrated) which are usually provided in a communication device, such as a microphone for receiving a voice input, a speaker for outputting a voice, and a global positioning system (GPS) function.

The AIS receiving section 11 is a receiving circuit for receiving information related to an automatic identification system (AIS). The AIS is a system for avoiding collisions between vessels. Examples of the information related to AIS include vessel identification information (marine mobile service identity (MMSI) code), a vessel name, a position, a course, a speed, a destination, and the like.

The DSC communication section 12 is a circuit for performing digital selective calling (DSC) wireless communication. The DSC wireless communication is a very high frequency (VHF) wireless communication with an automatic call function (DSC function) through digital communication added thereto, and can be used for distress, emergency, safety communication, and the like of a vessel.

The communication by the DSC communication section 12 is performed by the following procedure. First, a caller calls a communication target vessel on a calling channel, and designates a conversation channel to be used for a conversation. Subsequently, the caller and the communication target vessel perform DSC communications on the conversation channel having been designated by the caller. In the above procedure, a transmission output power value for calling the communication target vessel on the calling channel is stipulated by the standard to be a settable maximum output power value, and cannot be changed. On the other hand, a transmission output power value for performing communication on the conversation channel is not stipulated by the standard and can be changed as appropriate. Therefore, the transmission output power value for performing communication on the conversation channel does not necessarily have to be set to a maximum output power value. In the following description, the transmission output power value for performing DSC communication on the conversation channel is simply referred to as "transmission output power value".

The display section 13 is a display device that displays information to a user in the form of an image. Specific examples of the information displayed by the display section 13 include information related to AIS. Examples of the information related to AIS include a list of vessels with which the communication device 1 can communicate. The list may be a list of all vessels with which the communication device 1 can communicate, or may be a list of only vessels with which the communication device 1 can communicate and which are registered as friends. The vessels registered as friends are vessels which are registered as having some kind of relationship with a vessel on which the communication device 1 is installed. The display section 13 is, for example, a liquid crystal display or an organic electroluminescent (EL) display.

The input accepting section 14 is an input device that accepts an input of a user to the communication device 1. The input accepting section 14 is, for example, a button or a touch panel. Examples of the input of the user accepted by the input accepting section 14 include an input for selecting a communication target vessel from the list, displayed on the display section 13, of vessels which can communicate with the communication device 1.

The control section 15 controls the operation of the communication device 1. The control section 15 controls communications performed by the DSC communication section 12, based on, for example, an input of the user. Further, the control section 15 includes an AIS information display control section 15a, a distance calculating section 15b, and a transmission output power setting section 15c.

The AIS information display control section 15a causes the display section 13 to display AIS-related information having been received by the AIS receiving section 11. The distance calculating section 15b calculates, based on the AIS-related information having been received by the AIS receiving section 11, distances between the communication device 1 and the vessels which are within a communication range.

The transmission output power setting section 15c sets the transmission output power value to a value corresponding to a distance between the communication device 1 and the communication target vessel (hereinafter referred to as "communication distance"). As described above, the transmission output power value does not necessarily have to be set to the maximum output power value. Thus, the transmission output power setting section 15c sets the transmission output power value in multiple levels according to the communication distance within the bound of not interfering with DSC communications. Specifically, the transmission output power setting section 15c sets the transmission output power value to a smaller value as the communication distance is relatively shorter. Therefore, the communication device 1 can reduce the power consumption as compared with the case where the transmission output power value is always set to the maximum output power value. Specific processes of the transmission output power setting section 15c will be discussed later.

The storage section 16 is a storage section that stores information necessary for controlling the communication device 1. The storage section 16 stores, for example, information about a vessel registered as a friend. Further, if necessary, the storage section 16 stores, for example, the AIS-related information having been received by the AIS receiving section 11 and the information having been received through the communication by the DSC communication section 12. However, the communication device 1 does not necessarily have to include the storage section 16, and may be configured to be accessible to an external storage device that stores the same information as the one stored in the storage section 16.

(Specific Processes Performed by the Transmission Output Power Setting Section 15c)

During communication performed by the communication device 1, the communication distance can be changed due to the movement of the vessel on which the communication device 1 is installed and/or the movement of the communication target vessel. Thus, the transmission output power setting section 15c may set the transmission output power value to a value corresponding to a changed communication distance each time the communication distance is changed. By automatically changing the transmission output power value in this way, the communication device 1 can set an appropriate transmission output power value according to the changed communication distance.

The transmission output power setting section 15c may set the transmission output power value to a smaller value as the communication distance is shorter. Generally, in a case where the communication distance is short, communication is possible with a relatively small transmission output power value as compared with a case where the communication distance is long. By setting the transmission output power value in this way, the power consumption of the communication device 1 can be reduced as the communication distance is shorter.

Further, the transmission output power setting section 15c may set the transmission output power value to a minimum value when the communication distance falls below a lower limit threshold value. An example of the minimum value is 0.6 W. By setting the transmission output power value in this way, the communication device 1 maintains a minimum transmission output power value required for the communication even when the communication distance falls below the lower limit threshold value. This does not interfere with DSC communication.

Further, the transmission output power setting section 15c may set the transmission output power value to a maximum value when the communication distance exceeds an upper limit threshold value. An example of the maximum value is 6 W. By setting the transmission output power value in this way, the communication device 1 can communicate, at the maximum transmission output power value, with a vessel which has the communication distance to the communication device 1 exceeds the upper limit threshold value.

The above-described lower limit threshold value and upper limit threshold value may be set at the time of shipment of the communication device 1 or may be set by the user. Further, the lower limit threshold value and the upper limit threshold value may have the same value (hereinafter referred to as "threshold value T"). That is, the transmission output power setting section 15c may set the transmission output power value using one predetermined threshold value T. One example of the threshold value T is a maximum distance at which the communication target vessel can be visually recognized from the vessel of the user having the communication device 1. Further, another example of the threshold value T is one nautical mile (about 1.8 km). In such a case, the transmission output power value set by the transmission output power setting section 15c has two levels of Low and Hi. That is, the transmission output power setting section 15c sets the transmission output power value to Low (low output power value) (0.6 W as an example) when the communication distance is below the threshold value T, and sets the transmission output power value to Hi (high output power value) (6 W as an example) larger than Low when the communication distance is equal to or more than the threshold value T.

Further, in a case where the lower limit threshold value and the upper limit threshold value are provided separately, one or more threshold values may be further provided between the lower limit threshold value and the upper limit threshold value. In such a case, the transmission output power setting section 15c may reset the transmission output power value every time the communication distance crosses any of the threshold values.

The above-described determination based on the communication distance is similar to the determination of a dangerous zone. The dangerous zone means an area where a vessel on which the communication device 1 is installed and another vessel may collide with each other. The dangerous zone is individually defined for each of other vessels based on, for example, a relative position and speed between the communication device 1 and another vessel and a setting performed on the communication device 1 by the user. The transmission output power setting section 15c determines the communication distance in the same manner as the determination as to whether or not each of other vessels is present in the dangerous zone, and sets the transmission output power value based on the result of the determination.

A method of determining the transmission output power value does not have to be based on a comparison with the threshold value, and may be based on, for example, a mathematical formula that specifies a relationship between the communication distance and the transmission output power value.

Further, the transmission output power setting section 15c may set the transmission output power value according to the operation of the user regardless of the communication distance. For example, in a case where the user judges that the communication is about to be interrupted, the transmission output power setting section 15c sets the transmission output power value to a value larger than a current value by the operation of the user. By setting the transmission output power value in this way, the communication device 1 can set an appropriate transmission output power value according to the judgment of the user. In such a case, even when the communication distance has been changed, the transmission output power setting section 15c does not have to automatically change the transmission output power value according to the communication distance.

(Processes in the Control Section 15)

Figure 2:
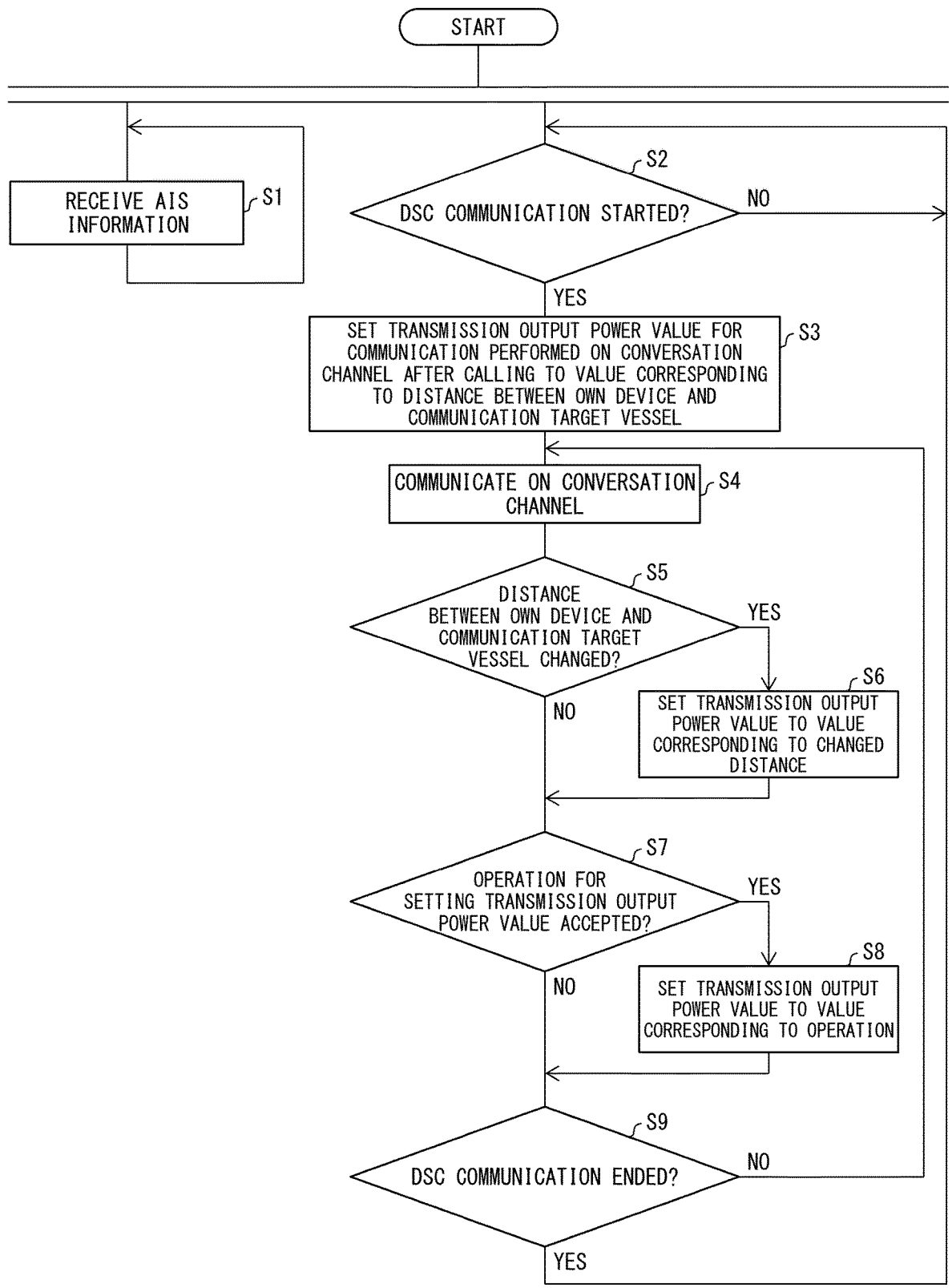
FIG. 2 is a flowchart illustrating a method for controlling the communication device in accordance with the embodiment of the present invention.

FIG. 2 is a flowchart illustrating a method for controlling the communication device 1. As illustrated in FIG. 2, in the communication device 1, the control section 15 performs the process (S1) related to the AIS receiving section 11 and the processes (S2 to S9) related to the DSC communication section 12 in parallel.

The process related to the AIS receiving section 11 is as follows. The control section 15 receives AIS-related information from the AIS receiving section 11 (S1). The control section 15 repeats the step S1 during the power-on condition of the communication device 1.

The processes related to the DSC communication section 12 are as follows. The control section 15 determines whether DSC communication by the DSC communication section 12 has been started (S2). If DSC communication has not been started (NO in S2), the control section 15 repeats step S2.

If DSC communication has been started (YES in S2), the transmission output power setting section 15c sets the transmission output power value, of the DSC communication section 12, for communication performed on the conversation channel after the communication target has been called on the calling channel, to a value corresponding to the communication distance (S3). Thereafter, the control section 15 communicates on the conversation channel (S4).

During the DSC communication, the transmission output power setting section 15c determines whether or not the communication distance has been changed (S5). If the communication distance has been changed (YES in S5), the transmission output power setting section 15c sets the transmission output power value to a value corresponding to the changed communication distance (S6). If the communication distance has not been changed (NO in S5), the transmission output power setting section 15c skips the step S6.

Further, the transmission output power setting section 15c determines whether an operation for setting the transmission output power value has been accepted (S7). If the operation for setting the transmission output power value has been accepted (YES in S7), the transmission output power setting section 15c sets the transmission output power value to a value corresponding to the operation (S8). If the operation for setting the transmission output power value has not been accepted (NO in S7), the transmission output power setting section 15c skips the step S8.

Thereafter, the control section 15 determines whether the communication by the DSC communication section 12 has been ended (S9). If the DSC communication has not been ended (NO in S9), the control section 15 repeats the process in the step S4 and the following processes. If the DSC communication has been ended (YES in S9), the control section 15 repeats the process in the step S2 and the following processes.

Through the above processes, the transmission output power setting section 15c sets the transmission output power value for communication on the conversation channel, based on the communication distance or the operation of the user. The processes in the steps S5 to S8 are not essential and can be omitted.

Figure 3:
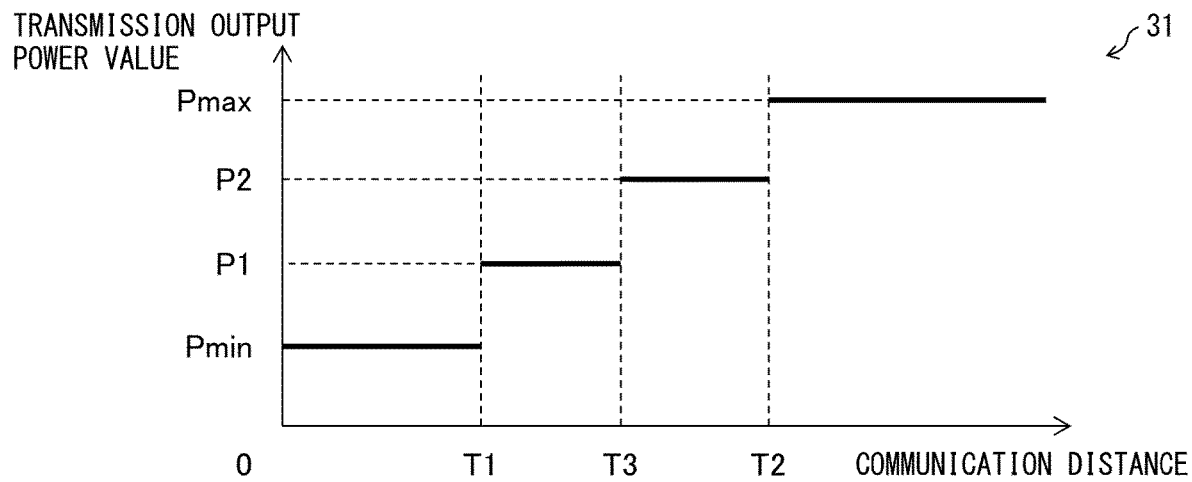
FIG. 3 is a graph showing examples of a relationship between a communication distance and a transmission output power value.
Figure 3:
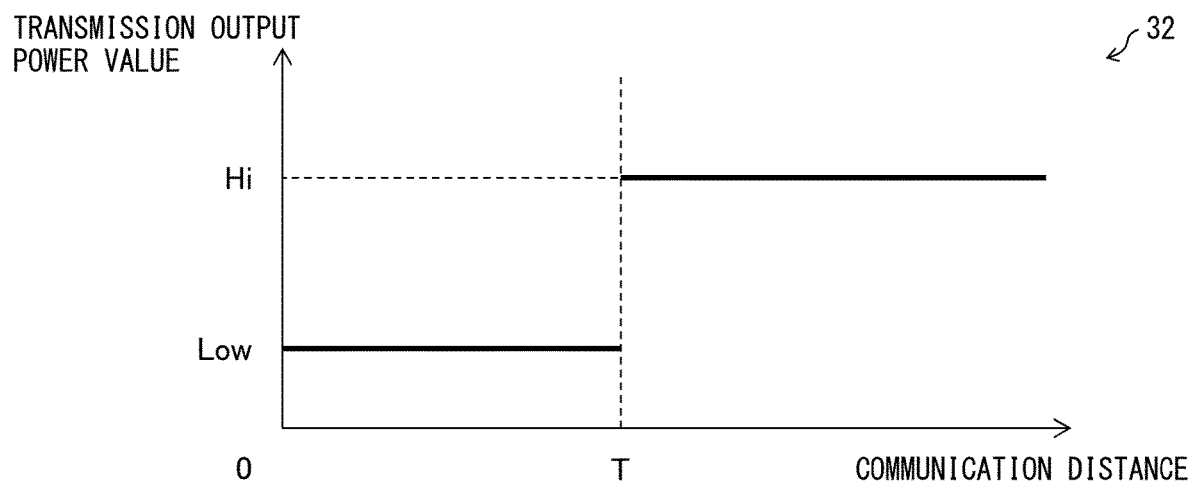
Figure 3:
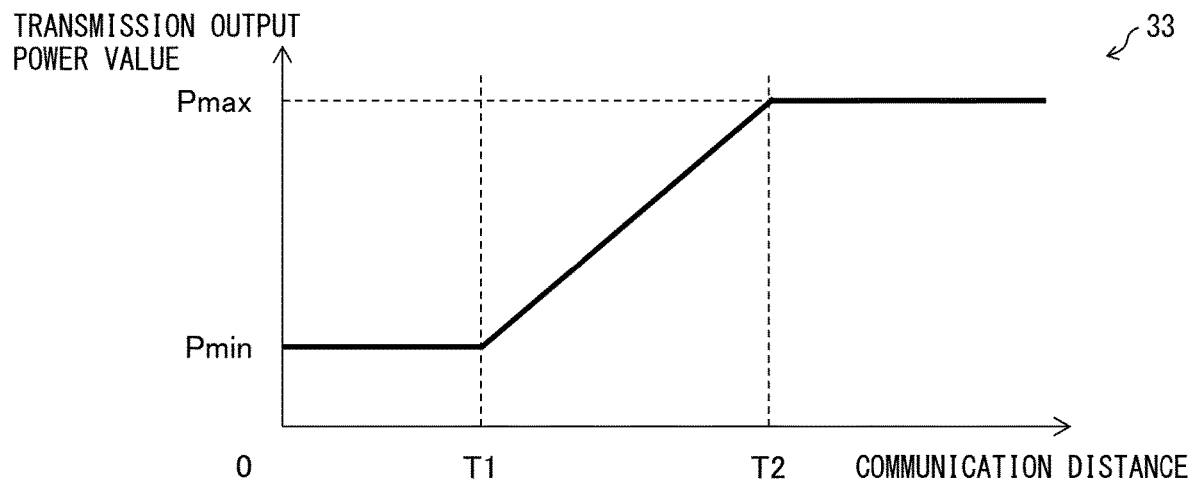

FIG. 3 is a graph showing examples of a relationship between the communication distance and the transmission output power value. In the graph shown in FIG. 3, a horizontal axis represents the communication distance, and a vertical axis represents the transmission output value.

An example indicated by reference numeral 31 is an example in which the transmission output power value is set in multiple levels. In this example, the transmission output power value is divided into four levels according to the communication distance. When the communication distance is below a lower limit threshold value T1, the transmission output power setting section 15c sets the transmission output power value to a minimum value Pmin. Further, when the communication distance is equal to or more than the lower limit threshold value T1 and is less than a threshold value T3, the transmission output power setting section 15c sets the transmission output power value to P1. Further, when the communication distance is equal to or more than the threshold value T3 and is less than an upper limit threshold value T2, the transmission output power setting section 15c sets the transmission output power value to P2. Further, when the communication distance exceeds the upper limit threshold value T2, the transmission output power setting section 15c sets the transmission output power value to a maximum value Pmax. A magnitude relationship between the threshold values of the communication distance is 0<T1<T3<T2. Further, a magnitude relationship between the transmission output power values is 0<Pmin<P1<P2<Pmax.

An example indicated by reference numeral 32 is an example in which the transmission output power value is set in two levels. In this example, the transmission output power value is divided into two levels with a threshold value T of the communication distance as a boundary. When the communication distance is below the threshold value T, the transmission output power setting section 15c sets the transmission output power value to a low output power value Low. Further, when the communication distance exceeds the threshold value T, the transmission output power setting section 15c sets the transmission output power value to a high output power value Hi. A magnitude relationship between the transmission output power values is 0<Low<Hi.

The example indicated by reference numeral 33 is an example in which the transmission output power value monotonously increases with respect to the communication distance. When the communication distance is below the lower limit threshold value T1, the transmission output power setting section 15c sets the transmission output power value to the minimum value Pmin. Further, when the communication distance exceeds the lower limit threshold value T1 and is below the upper limit threshold value T2, the transmission output power setting section 15c sets the transmission output power value so that the transmission output power value monotonously increases with respect to the communication distance within a range from the minimum value Pmin to the maximum value Pmax. Further, when the communication distance exceeds the upper limit threshold value T2, the transmission output power setting section 15c sets the transmission output power value to the maximum value Pmax.

Software Implementation Example

A control block (control section 15, particularly transmission output power setting section 15c) of the communication device 1 can be realized by a logic circuit (hardware) provided in an integrated circuit (IC chip) or the like or can be alternatively realized by software.

In the latter case, the communication device 1 includes a computer that executes instructions of a program that is software realizing the foregoing functions. The computer, for example, includes at least one processor and a computer-readable storage medium storing the program. An object of the present invention can be achieved by the processor of the computer reading and executing the program stored in the storage medium. Examples of the processor encompass a central processing unit (CPU). Examples of the storage medium encompass a "non-transitory tangible medium" such as a read only memory (ROM), a tape, a disk, a card, a semiconductor memory, and a programmable logic circuit. The computer may further include a random access memory (RAM) or the like in which the program is loaded. Further, the program may be supplied to or made available to the computer via any transmission medium (such as a communication network and a broadcast wave) which allows the program to be transmitted. Note that an aspect of the present invention can also be achieved in the form of a computer data signal in which the program is embodied via electronic transmission and which is embedded in a carrier wave.

Aspects of the present invention can also be expressed as follows:

A communication device in accordance with a first aspect of the present invention includes: an AIS receiving section for receiving information related to an AIS; a DSC communication section for performing DSC communication; and a transmission output power setting section configured to set a transmission output power value for communication performed on a conversation channel by the DSC communication section to a value corresponding to a distance, which is calculated based on the information, between the communication device and a communication target vessel.

According to the above configuration, the transmission output power setting section sets the transmission output power value for communication performed on a conversation channel by the DSC communication section to a value corresponding to a distance between the communication device and a communication target vessel. Thus, the communication device can set the transmission output power value in multiple levels according to the distance. This makes it possible to reduce power consumption as compared with a case where the transmission output power value is always set to a maximum output power value.

In a second aspect of the present invention, the communication device is preferably configured such that, in the first aspect of the present invention, every time the distance is changed, the transmission output power setting section sets the transmission output power value to a value corresponding to a changed distance.

According to the above configuration, even when the distance between the communication device and the communication target vessel is changed, the transmission output power value can be set to an appropriate value corresponding to a changed distance.

In a third aspect of the present invention, the communication device is preferably configured such that, in the first or second aspect of the present invention, the transmission output power setting section sets the transmission output power value to a smaller value as the distance is shorter.

According to the above configuration, the transmission output power setting section sets the transmission output power value to a small value in a case where the distance between the communication device and the communication target vessel is short. Generally, a case where the distance between the communication device and the communication target vessel is short enables communication with a lower transmission output power, as compared with the case where the distance between the communication device and the communication target vessel is long. Thus, the communication device can reduce the power consumption of the communication device by decreasing the transmission output power value for the communication which is performed when the distance between the communication device and the communication target vessel is short.

In a fourth aspect of the present invention, the communication device is preferably configured such that, in any of the first to third aspects of the present invention, when the distance is below a lower limit threshold value, the transmission output power setting section sets the transmission output power value to a minimum value.

According to the above configuration, when the distance between the communication device and the communication target vessel is below the lower limit threshold value, the transmission output power value is set to the minimum value. Thus, even when the communication distance falls below the lower limit threshold value, the communication device maintains a minimum transmission output power value required for the communication. This does not interfere with DSC communication.

In a fifth aspect of the present invention, the communication device is preferably configured such that, in any of the first to fourth aspects of the present invention, when the distance exceeds the upper limit threshold value, the transmission output power setting section sets the transmission output power value to a maximum value.

According to the above configuration, when the distance between the communication device and the communication target vessel exceeds the upper limit threshold value, the transmission output power setting section sets the transmission output power value to the maximum value. Thus, the communication device can communicate, at the maximum transmission output power value, with a vessel which has the communication distance to the communication device exceeds the upper limit threshold value.

In a sixth aspect of the present invention, the communication device can be configured such that, in any of the first to third aspects of the present invention, when the distance is below a predetermined threshold value, the transmission output power setting section sets the transmission output power value to a low output power value, and when the distance exceeds the predetermined threshold value, the transmission output power setting section sets the transmission output power value to a high output power value which is larger than the low output power value.

According to the above configuration, the transmission output power value is set in two levels based on a predetermined threshold value of the distance between the communication device and the communication target vessel.

In a seventh aspect of the present invention, the communication device is preferably configured such that, in any of the first to sixth aspects of the present invention, the transmission output power setting section sets the transmission output power value according to the operation of the user, regardless of the distance.

According to the above configuration, the communication device can appropriately set the transmission output power value according to the judgment of the user.

A method for controlling a communication device in accordance with an eighth aspect of the present invention, includes: the communication device receiving information related to an AIS; the communication device performing DSC communication; and the communication device setting a transmission output power value for DSC communication performed on a conversation channel to a value corresponding to a distance, which is calculated based on the information, between the communication device and a communication target vessel.

According to the above configuration, the same effect as in the first aspect is produced.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

1: communication device
11: AIS receiving section
12: DSC communication section
15c: transmission output power setting section

The invention claimed is:

1. A communication device comprising:
an automatic identification system (AIS) receiving section for receiving information related to an AIS;
a digital selective calling (DSC) communication section for performing DSC communication; and
a transmission output power setting section configured to set a transmission output power value for communication performed on a conversation channel by the DSC communication section to a value corresponding to a distance, which is calculated based on the information, between said communication device and a communication target vessel,
wherein when the distance is below a predetermined threshold value, the transmission output power setting section sets the transmission output power value to a low output power value, and
wherein when the distance exceeds the predetermined threshold value, the transmission output power setting section sets the transmission output power value to a high output power value which is larger than the low output power value.

2. The communication device according to claim 1, wherein every time the distance is changed, the transmission output power setting section sets the transmission output power value to a value corresponding to a changed distance.

3. The communication device according to claim 1, wherein the transmission output power setting section sets the transmission output power value to a smaller value as the distance is shorter.

4. The communication device according to claim 1, wherein when the distance is below a lower limit threshold value, the transmission output power setting section sets the transmission output power value to a minimum value.

5. The communication device according to claim 1, wherein when the distance exceeds the upper limit threshold value, the transmission output power setting section sets the transmission output power value to a maximum value.

6. A communication device comprising:
an automatic identification system (AIS) receiving section for receiving information related to an AIS;
a digital selective calling (DSC) communication section for performing DSC communication; and
a transmission output power setting section configured to set a transmission output power value for communication performed on a conversation channel by the DSC communication section to a value corresponding to a distance, which is calculated based on the information, between said communication device and a communication target vessel,
wherein the transmission output power setting section sets the transmission output power value according to the operation of the user, regardless of the distance.

7. A method for controlling a communication device, comprising:
- the communication device receiving information related to an automatic identification system (AIS);
- the communication device performing digital selective calling (DSC) communication; and
- the communication device setting a transmission output power value for DSC communication performed on a conversation channel to a value corresponding to a distance, which is calculated based on the information, between the communication device and a communication target vessel, the communication device setting the transmission output power value to a low output power value when the distance is below a predetermined threshold value and the communication device setting the transmission output power value to a high output power value which is larger than the low output power value when the distance exceeds the predetermined threshold value.

* * * * *